United States Patent [19]

Lenzi et al.

[11] Patent Number: 4,982,983

[45] Date of Patent: Jan. 8, 1991

[54] PERFECTED INJECTOR SUPPLY FITTING

[75] Inventors: Gianluigi Lenzi; Paolo Bortolotti, both of Bologna, Italy

[73] Assignee: Weber S.r.l., Turin, Italy

[21] Appl. No.: 511,984

[22] Filed: Apr. 13, 1990

Related U.S. Application Data

[63] Continuation of Ser. No. 290,155, Dec. 27, 1988, abandoned.

[30] Foreign Application Priority Data

Dec. 24, 1987 [IT] Italy ............... 68127 A/87

[51] Int. Cl.5 ............................................. F16L 27/00
[52] U.S. Cl. ..................................... 285/281; 285/365
[58] Field of Search ............... 285/365, 366, 281, 179, 285/407, 408, 409

[56] References Cited

U.S. PATENT DOCUMENTS 2,690,939 10/1954 Whaley ........................ 285/365 X
2,777,714 1/1957 Lamphere ..................... 285/179 X
3,154,328 10/1964 Masse ............................. 285/365 X
4,407,533 10/1983 Giebeler ......................... 285/365 X

FOREIGN PATENT DOCUMENTS 2001629 7/1971 Fed. Rep. of Germany ...... 285/365
624053 9/1978 U.S.S.R. ............................. 285/365
540375 4/1940 United Kingdom .
1581051 3/1977 United Kingdom .

Primary Examiner—Dave W. Arola
Attorney, Agent, or Firm—Jeffers, Hoffman & Niewyk

[57] ABSTRACT

A fitting consisting of a cap having a tube projecting radially or along the longitudinal axis of the injector, for connecting the injector supply tube, the cap being fitted in idle and fluidtight manner, via the interposition of an O-ring, on to a union on the injector; and a pair of coaxially-mating half rings fitted in axially integral manner partly on the cap and partly on the union, and held together by a retainer ring snapped externally on to the same.

7 Claims, 2 Drawing Sheets

PERFECTED INJECTOR SUPPLY FITTING

This is a continuation of application Ser. No. 290,155, filed Dec. 27, 1988 and now abandoned.

BACKGROUND OF THE INVENTION

The present invention relates to a perfected fitting between the fuel supply tube and injector of a vehicle internal combustion engine.

The fuel injectors of internal combustion engines are generally connected to the supply tube using fittings substantially consisting of a cap having a coaxial tube for connecting the supply tube, and fitted in fluidtight manner, via the interposition of a sealing ring, on to a union on the injector. The same union is fitted, inside an annular groove, with a clip connected at the assembly stage to the cap for securing this integral with the union.

Fittings of the aforementioned type present a number of drawbacks. In particular, they are not always easy to assemble; do not permit automated on-line assembly; and are fairly cumbersome, due to the supply tube only being connectable coaxial with the injector.

SUMMARY OF THE INVENTION

The aim of the present invention is to provide an injector supply tube fitting which, with no design changes to the unions currently employed on known injectors, provides for troublefree, fast, readily-automatable and axially-compact connection of the injector supply tube.

With this aim in view, according to the present invention, there is provided a fitting for connecting an injector supply tube; said fitting comprising a hydraulic connecting cap fitted, via the interposition of a sealing ring, on to the union of said injector and having a tube for connecting said supply tube; and means for connecting said cap to said union; characterised by the fact that said means for connecting said cap to said union comprise: a pair of coaxially-mating half rings fitted together partly on said union and partly on said cap, and each having opposed axial shoulders cooperating with respective shoulders on said cap and said union, in such a manner as to axially lock the same; and elastic means for locking said half rings together, and fitted externally to the same.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
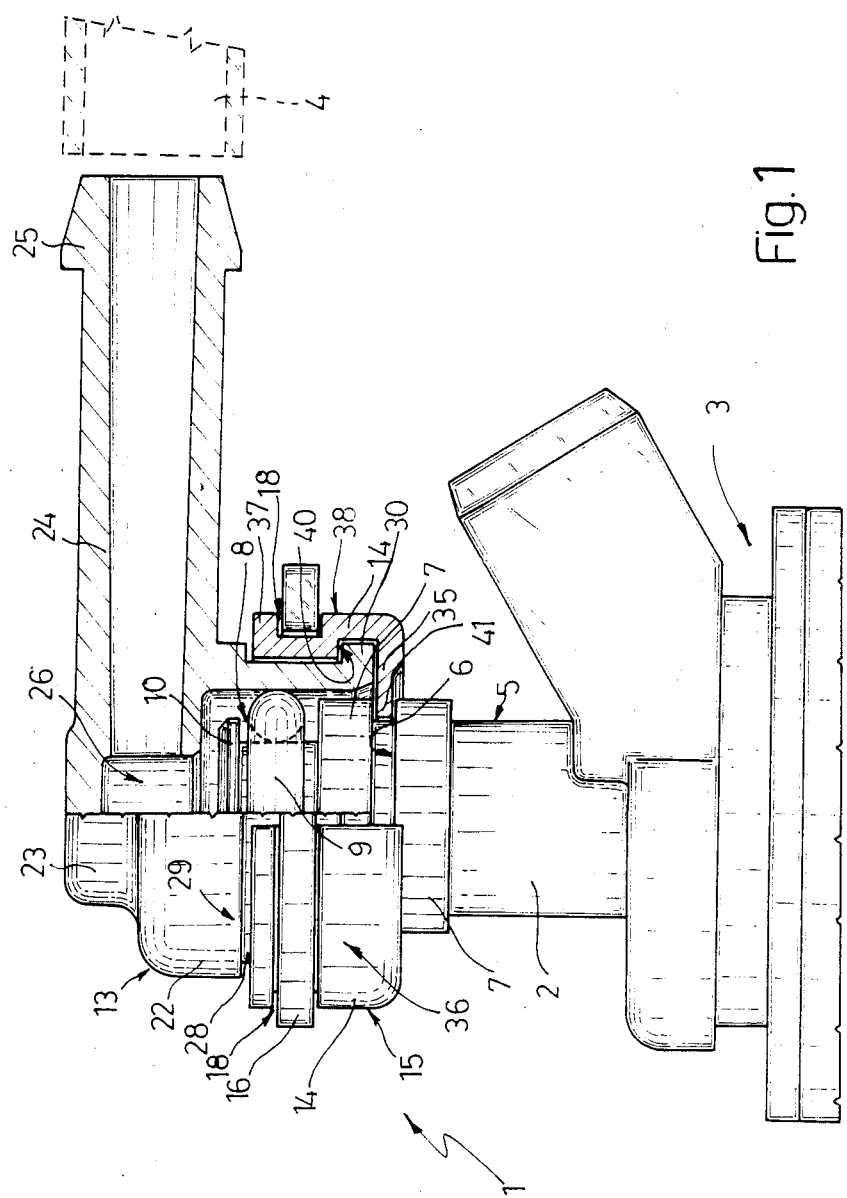
FIG. 1 shows a partially-sectioned view of an injector featuring a fitting in accordance with the teachings of the present invention.
Figure 2:
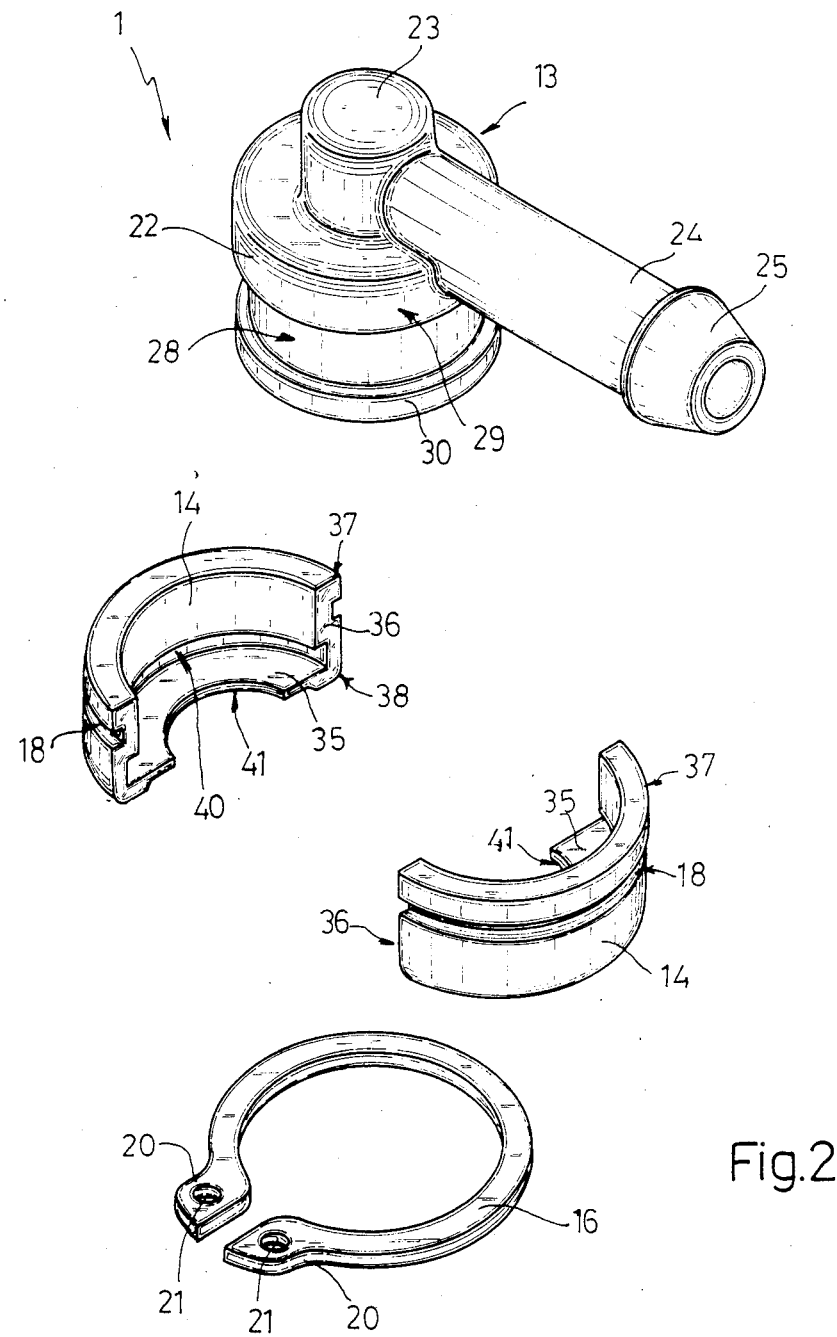
FIG. 2 shows an enlarged view in perspective of the fitting according to the present invention.

Number 1 in FIGS. 1 and 2 indicates a fitting between a union 2 supplying any known type of injector 3 (shown only partly for the sake of simplicity) and a known type of fuel supply tube 4 shown by the dotted line. Union 2 is of known type and presents, on cylindrical outer surface 5, an annular groove 6 formed between two cylindrical stops 7 larger in diameter than the rest of union 2; and a seat 8 for a known type of O-ring seal 9 fitted in elastically deformable manner on to union 2 beyond stop 10. Groove 6 is the one by which known fittings are secured to injector 3 and, according to the present invention, is also employed unchanged by fitting 1 as described in detail later on.

Fitting 1 comprises a hydraulic connecting cap 13 fitted coaxially on to union 2 in idle and fluidtight manner, via the interposition of sealing ring 9; and means for axially connecting cap 13 to union 2 using groove 6 already provided for this purpose on known unions 2. According to the present invention, said connecting means comprise a pair of identical, semicircular, specularly symmetrical half rings 14 which may be fitted together coaxially to form a ring 15 of such a size as to fit coaxially and externally on to cap 13, partly on cap 13 itself and partly on union 2; and elastic means consisting, in the non-limiting embodiment shown, of a known commonly used retainer ring 16, designed to fit externally on to half rings 14 and so secure the same together for forming said ring 15. In particular, retainer ring 16 is snapped in removable manner inside semiannular grooves 18 formed symmetrically on respective cylindrical outer surfaces 19 of half rings 14, and presents opposed radial appendixes 20 with holes 21, by which ring 16 may be gripped using pliers and deformed elastically for securing or removing it to/from the continuous annular groove defined by grooves 18 on half rings 14 when these are joined together.

Cap 13 is in the form of a body of revolution, and comprises a large-diameter cylindrical portion 22 designed to fit coaxially on to union 2; and a cup-shaped cylindrical top end portion 23 having a smaller diameter and formed in one piece with portion 22. In the non-limiting example shown, said portion 23 presents a radial tube 24 for connecting tube 4, and projecting radially outwards of cap 13 with which it is formed in one piece. According to two variations (not shown), said tube 24 may, obviously, project radially outwards of cap 13 at any angle in relation to the axis of injector 3 other than the angle shown; or it may project axially from cap 13, as on known fittings, coaxial with the longitudinal axis of injector 3. Whichever solution is adopted, tube 24 presents a flared end 25 on to which tube 4 is fitted in known manner, and is connected hydraulically to an inner cavity 26 on cap 13 defined by cup-shaped portion 23 and, like this, coaxial with union 2, so as to provide for linear fluel flow to injector 3. According to the present invention, portion 22 presents an annular outer groove 28 formed on the cylindrical outer surface 29 of cap 13 and defined towards union 2, i.e. on the opposite side to tube 24, by a raised peripheral annular edge 30 of cap 13. Said groove 28 and edge 30 define respective opposed annular axial shoulders formed integral with cap 13 and designed, according to the present invention, to cooperate with respective axial shoulders on half rings 14, for axially securing the same, when held together by ring 16, to cap 13.

According to the present invention, half rings 14 present further opposed axial soulders designed to cooperate with the annular axial shoulder defined by groove 6 on union 2, for axially securing joined half rings 14 to both cap 13 and union 2, and so axially lock the same while at the same time enabling cap 13 to rotate on union 2. In particular, each half ring 14 is substantially cup-shaped, and comprises a bottom wall 35 in the form of a semicircular ring; and a semicylindrical lateral wall 36 perpendicular to bottom wall 35 and consisting of a first semitoroidal C-section portion 37 having its concave side facing outwards, and a second semitoroidal C-section portion 38 having its concave side facing inwards of half ring 14 and an opposite profile to that of portion 37; said portions 37 and 38 being arranged on top of each other and formed in one piece with each other and with bottom wall 35. Portion 37 presents outer semiannular groove 18, and is designed internally to engage annular groove 28 on cap 13. Portion 38, on the other hand, presents an inner semiannular groove 40 engaged by raised annular edge 30 on cap 13 (FIG. 1). Bottom wall 35 of each half ring 14 is defined internally by a semicircular peripheral edge 41 smaller in diameter than lateral wall 36 and designed to engage respective annular groove 6 formed externally on union 2, for axially securing respective half ring 14 to the same.

Assembly of fitting 1 is as follows. After first assembling sealing ring 9, cap 13 is fitted in the usual way on to union 2, after which, half rings 14 are fitted on to cap 13 and union 2. Each of half rings 14 is assembled by inserting edge 41 inside groove 6, and portion 37 inside groove 28, taking care to engage a respective portion of edge 30 inside each semiannular groove 40. When so mated, half rings 14 are secured together by retainer ring 16, so as to form ring 15, which thus defines a mechanical connecting element axially securing cap 13 on to union 2, while at the same time enabling it to rotate.

The advantages of the fitting according to the present invention will be clear from the foregoing description. Firstly, the connecting device consisting of two half rings 14 joined together by retainer ring 16 is extremely cheap and easy to produce and assemble. Secondly, said connecting device is designed to exploit the groove 6 already provided for on known injectors for housing the clip securing the hydraulic connecting cap, thus enabling the fitting according to the present invention to be employed on currently used injectors with no alterations to the same. Finally, the changes made to the cap according to the present invention enable the tube connecting the fuel supply tube to be assembled in any position (by simply rotating cap 13), as well as to the side and at any angle in relation to the axis of the injector. In addition to providing for an extremely compact injector and fuel supply tube, the above characteristic also enables the same fitting to be employed on engines featuring different fuel supply tube arrangements. In view of the simplicity with which the fitting according to the present invention is assembled, this may obviously be robotized or at least automated to a large extent.

We claim:

1. In combination with a fuel supply tube and a fuel injector having a union including an axial shoulder, a fitting for connecting said fuel supply tube to said fuel injector, the improvement comprising:

a hydraulic connecting cap fitted onto said union, said cap having a connection tube removably connected to said fuel supply tube, said cap having an outer cylindrical surface including an axial groove defined towards said union by a raised annular edge;

a sealing ring interposed between said cap and said union providing a fluid-tight relationship therebetween; and means for mechanically connecting said cap to said union such that said cap rotatably engages said union, said means for connecting including a pair of coaxially-mating half rings assembled partly on said union and partly on said cap, each said half ring including a bottom wall having a shape of a semi-circular ring, each said bottom wall having an internally facing edge engaging said axial shoulder of said union, each said half ring further including a lateral wall perpendicular to said bottom wall, each said lateral wall having a first semitoroidal C-section portion defining an external semiannular groove and internally engaging said annular groove of said cap, each said lateral wall having a second semitoroidal C-section portion oppositely oriented to said first semitoroidal C-section portion and having an internal semiannular groove engaged by said raised annular edge of said cap, said bottom walls axially securing said union and said cap in rotatable engagement, and elastic means externally engaging each said external semiannular groove to removably connect said half rings together.

2. A fitting as claimed in claim 1, characterised by the fact that said elastic means includes a retainer ring snapped in removable manner into said respective external semiannular grooves formed symmetrically on respective cylindrical outer surfaces of said half rings.

3. A fitting as claimed in claim 2, characterised by the fact that said retaining ring is a snap ring.

4. A fitting as claimed in claim 1, characterised by the fact that said connecting cap is in the form of a body of revoltuion designed to fit in a rotatable manner on to said union; and by the fact that said tube connecting said fuel supply tube is connected to an inner cavity on said cap coaxial with said union.

5. A fitting as claimed in claim 4, characterised by the fact that said tube connecting said fuel supply tube projects axially outwards of said cap, coaxial with said injector.

6. A fitting as claimed in claim 4, characterised by the fact that said tube connecting said fuel supply tube projects radially outwards of said cap.

7. A fitting as claimed in claim 5, characterised by the fact that said connecting tube is formed in one piece with said cap, on a smaller-diameter upper portion of said cap.

* * * * *